(12) United States Patent
Danis et al.

(10) Patent No.: US 8,442,586 B2
(45) Date of Patent: May 14, 2013

(54) DETERMINING USB/ISO INTERFACE AND POWER SUPPLY VOLTAGE IN MOBILE DEVICE

(75) Inventors: Frederic Danis, La Colle sur Loup (FR); Francois M. Amand, Nice (FR); Jean-Yves Carre, Le Cannet (FR)

(73) Assignee: Texas Instruments Incorporated, Dallas, TX (US)

( * ) Notice: Subject to any disclaimer, the term of this patent is extended or adjusted under 35 U.S.C. 154(b) by 529 days.

(21) Appl. No.: 12/333,592

(22) Filed: Dec. 12, 2008

(65) Prior Publication Data

US 2009/0280865 A1 Nov. 12, 2009

(30) Foreign Application Priority Data

May 8, 2008 (EP) .................................... 08290440

(51) Int. Cl.
 *H04B 1/38* (2006.01)
(52) U.S. Cl.
 USPC ............ 455/558; 455/557; 235/492; 320/132
(58) Field of Classification Search .................. 455/557, 455/558; 235/492, 441, 440, 380, 451, 487; 320/132
See application file for complete search history.

(56) References Cited

U.S. PATENT DOCUMENTS

| | | | |
|---|---|---|---|
| 6,946,817 B2 * | 9/2005 | Fischer et al. ................ | 320/132 |
| 7,206,603 B2 * | 4/2007 | Shinohara ..................... | 455/557 |
| 7,328,849 B2 * | 2/2008 | Leaming ....................... | 235/492 |
| 2004/0249625 A1 * | 12/2004 | Leaming ....................... | 703/27 |
| 2005/0259673 A1 * | 11/2005 | Lu et al. ....................... | 370/419 |
| 2006/0079284 A1 * | 4/2006 | Lu et al. ....................... | 455/558 |
| 2007/0142084 A1 * | 6/2007 | Van Niekerk et al. ........ | 455/557 |
| 2007/0200003 A1 | 8/2007 | Deprun et al. | |

FOREIGN PATENT DOCUMENTS

| | | |
|---|---|---|
| EP | 1833006 A2 | 9/2007 |
| KR | 100757533 B1 | 9/2007 |

\* cited by examiner

*Primary Examiner* — Jean B Jeanglaude
(74) *Attorney, Agent, or Firm* — Ronald O. Neerings; Wade James Brady, III; Frederick J. Telecky, Jr.

(57) ABSTRACT

A system and method for automatically determining a type of electrical interface used by a Universal Integrated Circuit Card ("UICC") card. In one embodiment, a wireless device includes a UICC card port, and UICC detector. The UICC detector determines which of a plurality of electrical interfaces are provided by a UICC card coupled to the UICC card port. The UICC detector configures the UICC card port in accordance with a provided electrical interface of the UICC card.

5 Claims, 4 Drawing Sheets

DETERMINING USB/ISO INTERFACE AND POWER SUPPLY VOLTAGE IN MOBILE DEVICE

The present application claims priority to European patent application No. 08290440.0, filed on May 8, 2008, entitled "Method For Automatically Detecting UICC Interface" and hereby incorporated herein by reference.

BACKGROUND

Cellular telephones and various other wireless devices utilizing the Global System for Mobile Communications ("GSM") system are used worldwide. Such devices employ a smart card including a Subscriber Identity Module ("SIM") that identifies the subscriber, and stores various subscriber information. Technically, a SIM is an application residing in an integrated circuit card ("ICC"). However, the card itself is commonly referred to as a "SIM card." A SIM card is issued by a wireless networking company for insertion into a wireless device used on the company's network. The SIM card is advantageous in that the subscriber information stored therein, for example, contact information, text messages, etc., can be easily transferred from one device to another by moving the SIM card.

In the Universal Mobile Telecommunications System ("UMTS"), the Universal Integrated Circuit Card ("UICC") is used. The UICC is analogous to the SIM card, but allows extended functionality. The UICC card comprises a Universal Subscriber Identity Module ("USIM") corresponding to the SIM of the GSM SIM card, and a USIM Application Toolkit that enables the wireless device to be configured directly via the UMTS radio network. Like the SIM, the USIM stores subscriber and authentication information that enable network access. The USIM also provides storage for third party application programs.

UICC cards generally employ an external interface specified by the International Organization for Standardization ("ISO"), specifically, ISO 7816. Different parts of the ISO 7816 standard specify different physical and electrical interfaces for use with various smart cards, such as the UICC card.

SUMMARY

Various systems and methods for detecting the interface type of a Universal Integrated Circuit Card ("UICC") connected to wireless device are disclosed herein. In accordance with at least some embodiments, a wireless device includes a Universal Integrated Circuit Card ("UICC") card port; and a UICC detector. The UICC detector determines which of a plurality of electrical interfaces are provided by a UICC card coupled to the UICC card port. The UICC detector configures the UICC card port in accordance with a provided electrical interface of the UICC card.

In accordance with at least some other embodiments, a method includes determining whether a Universal Integrated Circuit Card ("UICC") card connected to a UICC port of a wireless device supports only an ISO 7816-3 interface, only a Universal Serial Bus ("USB") interface as defined per the Inter-Chip USB Supplement to the USB 2.0 specification, or both a USB interface and an International Organization for Standardization ("ISO") 7816-3 interface. The UICC port is configured to operate with a highest data rate interface supported by the UICC card.

In accordance with yet other embodiments, a system includes a mobile wireless device that supports a plurality of Universal Integrated Circuit Card ("UICC") interfaces. The mobile wireless device comprises means for automatically determining which of the plurality of UICC interfaces an installed UICC card supports, and means for configuring a UICC port in accordance with a determined UICC interface of the installed UICC card.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
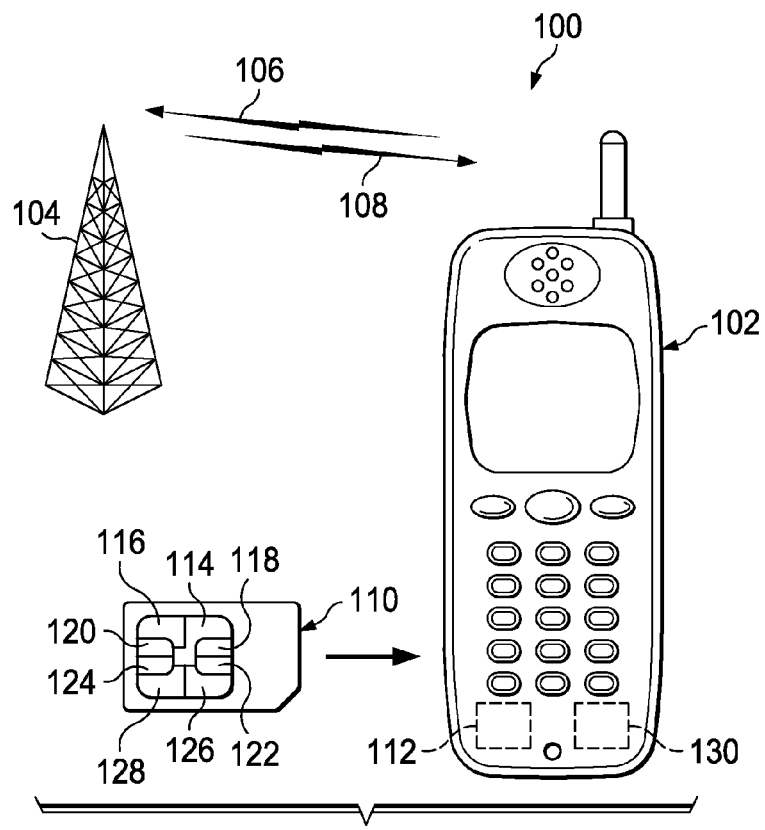
FIG. 1 shows an exemplary wireless network including a wireless device that automatically detects a Universal Integrated Circuit Card ("UICC") card interface in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein are a system and method for automatically detecting an interface type of a Universal Integrated Circuit Card ("UICC") card. To accommodate the increasing functionality of mobile wireless devices, the data and/or program storage provided by a UICC card must be increased. For example, high-density subscriber identity module ("HD- SIM") UICC cards can include gigabytes of storage. To facilitate access to such large amounts of storage, high-speed interfaces are being added to UICC cards. For example, the ISO 7816-12 specification, by the International Organization for Standardization ("ISO"), defines a smart card that includes a Universal Serial Bus ("USB") interface. Incorporating a USB interface, for example, a full-speed USB interface allowing up to 12 mega-bits per second ("Mb/s"), provides a substantial improvement over older interfaces, such as the interface specified by ISO 7816-3, which may be limited to a one hundred kilo-bits per second ("Kb/s") data transfer rate.

While the USB interface is advantageous in terms of access rate, the UICC USB interface will coexist, for at least the immediate future, with established UICC interface standards such as ISO 7816-3. Therefore, mobile wireless devices can benefit from the ability to automatically detect which interface standard(s) a UICC card supports and to configure a UICC port of the wireless device accordingly. Embodiments of the present disclosure provide such capabilities.

FIG. 1 shows an exemplary wireless network 100 including a wireless device 102 that automatically detects a ("UICC") card 110 interface in accordance with various embodiments. The exemplary wireless network 100 includes base station 104, though in practice, a wireless network may include more base stations than illustrated. A base station may also be known as a fixed access point, a Node B, an e-Node B, etc. The mobile wireless device 102 can be a cellular telephone, a computer network access card, or any other user equipment ("UE") employed by a user to communicate via the wireless network 100. As a matter of convenience, only a single mobile wireless device is shown, however, in practice system 100 may include any number of UEs. The mobile wireless device 102 may also be called a mobile terminal, a mobile station, etc. The base station 104 transmits to the mobile wireless device 104 via down-link 106, and receives transmissions from mobile wireless device 104 via up-link 108.

The mobile wireless device 102 is configured to accept a UICC card 110. The UICC card 110 preferably includes a Universal Subscriber Identity Module ("USIM") that provides authentication of the remote wireless device 102 thus facilitating access to the wireless network. The UICC card 110 includes an interface conforming to one or more of a variety of interface standards. The UICC card 110 preferably employs a USB interface in conformance with ISO 7816-12 and/or an interface satisfying ISO 7816-3. Information regarding ISO 7816-3 is available in the ISO/IEC 7816-3 specification, entitled "Identification cards—Integrated circuit cards—Part 3: Cards with contacts—Electrical interface and transmission protocols." Information regarding ISO 7816-12 is available in the ISO/IEC 7816-12 specification, entitled "Identification cards—Integrated circuit cards—Part 12: Cards with contacts—USB electrical interface and operating procedures."

Embodiments of the UICC card 110 include a set of contacts through which the UICC card 110 is electrically connected to the mobile wireless device 102. An embodiment of a UICC card 110 implementing an ISO 7816-3 interface preferably includes contacts 114, 116, 118, 120, 122, and 124. Note that although a preferred contact arrangement will now be described, embodiments of the present disclosure are not limited to any particular contact arrangement.

Contacts 116 and 114 preferably respectively provide a power supply voltage and a ground reference to the UICC 110. The power supply voltage provided to the UICC card 110 through contact 116 can vary. In some embodiments (e.g., ("class B")) a voltage in the range of 2.7 volts ("V") to 3.3 V (i.e., about 3 V) is preferred. In some embodiments (e.g., (class "C")), a voltage in the range of 1.65 V to 1.95 V (i.e., about 1.85 V) is preferred. However, embodiments of the present disclosure are not limited to any particular voltages.

In at least some UICC card 110 embodiments implementing an ISO 7816-3 interface, contact 120 provides a reset signal, contact 118 provides a programming voltage, (e.g., for writing to non-volatile memories), contact 124 provides a clock signal (e.g., for synchronizing data input/output operations), and contact 122 provides data input/output signals. Contacts 126 and 128 are unused in some embodiments implementing an ISO 7816-3 interface.

In at least some UICC card 110 embodiments implementing a USB interface, contact 128 provides the positive signal of a USB differential data pair, and contact 126 provides the negative signal of the USB differential data pair.

Embodiments of a UICC card 110 can implement the USB interface, the ISO 7816-3 interface or both the USB and ISO 7816-3 interfaces.

The mobile wireless device 102 includes a UICC port 112 that couples the UICC card 110 to the mobile wireless device 102. The mobile wireless device also includes a UICC port detector 130 that automatically determines which of the available interfaces (e.g., USB, ISO 7816-3, etc.) the UICC card 110 supports, and configures the UICC port 112 for operation with the UICC card 110. Thus, embodiments of the present disclosure are capable of using a wide variety of UICC cards without user input as to the card's interface specifications.

Figure 2:
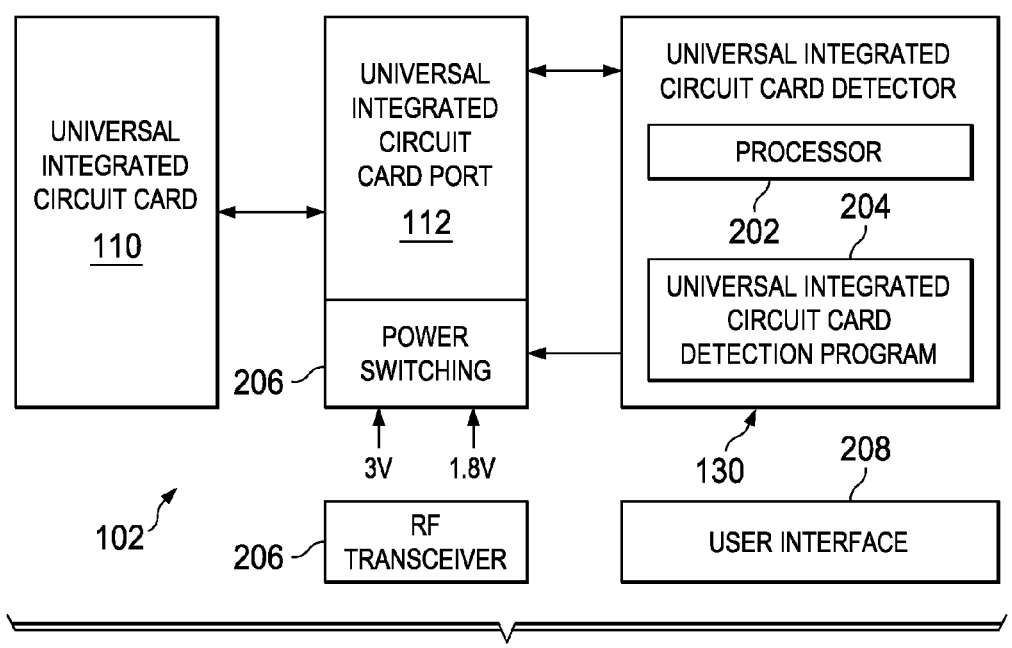
FIG. 2 shows an exemplary block diagram of a wireless device that automatically detects a UICC card Interface in accordance with various embodiments.

FIG. 2 shows an exemplary block diagram of a wireless device 102 that automatically detects a UICC card 110 interface in accordance with various embodiments. The wireless device 102 includes a UICC card 110, an interface detector 130, and a UICC port 112. The UICC port 112 couples the wireless device 102 to a UICC card 110, which is preferably installed in the wireless device 102. The UICC card 110 supports one or more of several electrical interface specifications, for example, USB, ISO 7816-3, etc. The wireless device 102 is compatible with at least the USB and ISO 7816-3 interface specifications.

The UICC detector 130 automatically determines which interface specification(s) the UICC card 110 supports. In at least some embodiments, the UICC detector 130 includes a processor 202, and UICC detector software programming 204 stored in processor readable storage (e.g., semiconductor memory) to perform the detection. The processor 202 can be any processor available in the mobile wireless device 102, for example, a general purpose processor, microcontroller, or digital signal processor. The UICC detection software program can be stored in any storage device readable by the processor 202, for example, a semiconductor memory such as read-only-memory, random-access-memory, etc. In at least some embodiments, UICC detection software 204 implements the functions described in FIG. 4 below.

The UICC port 112 includes power switching module 206 to vary the power supply voltage provided to the UICC card 110 in accordance with a detected UICC 110 card interface. In some embodiments, the power switching module 206 selects from multiple voltages to provide a power supply voltage to the UICC card 110. In some embodiments, the power switching module 206 includes a variable output voltage regulator to provide a power supply voltage in accordance with the determined UICC card 110 interface. As shown, selection of a UICC card 110 power supply voltage via the power switching module 206 is preferably controlled by the UICC detector 130. At least some embodiments of the UICC port 112 include level shifters to shift signal voltages to/from the signal voltages employed by the UICC card 110 and the wireless device 102.

The mobile wireless device 102 also include radio frequency transceiver circuitry 206 for transmitting RF signals on up-link 106 and receiving RF signals on down-link 108, and user interface circuitry 208 (e.g., audio input/output, display, keyboard, touch screen, etc.) for providing data to and receiving data from a user.

Figure 3:
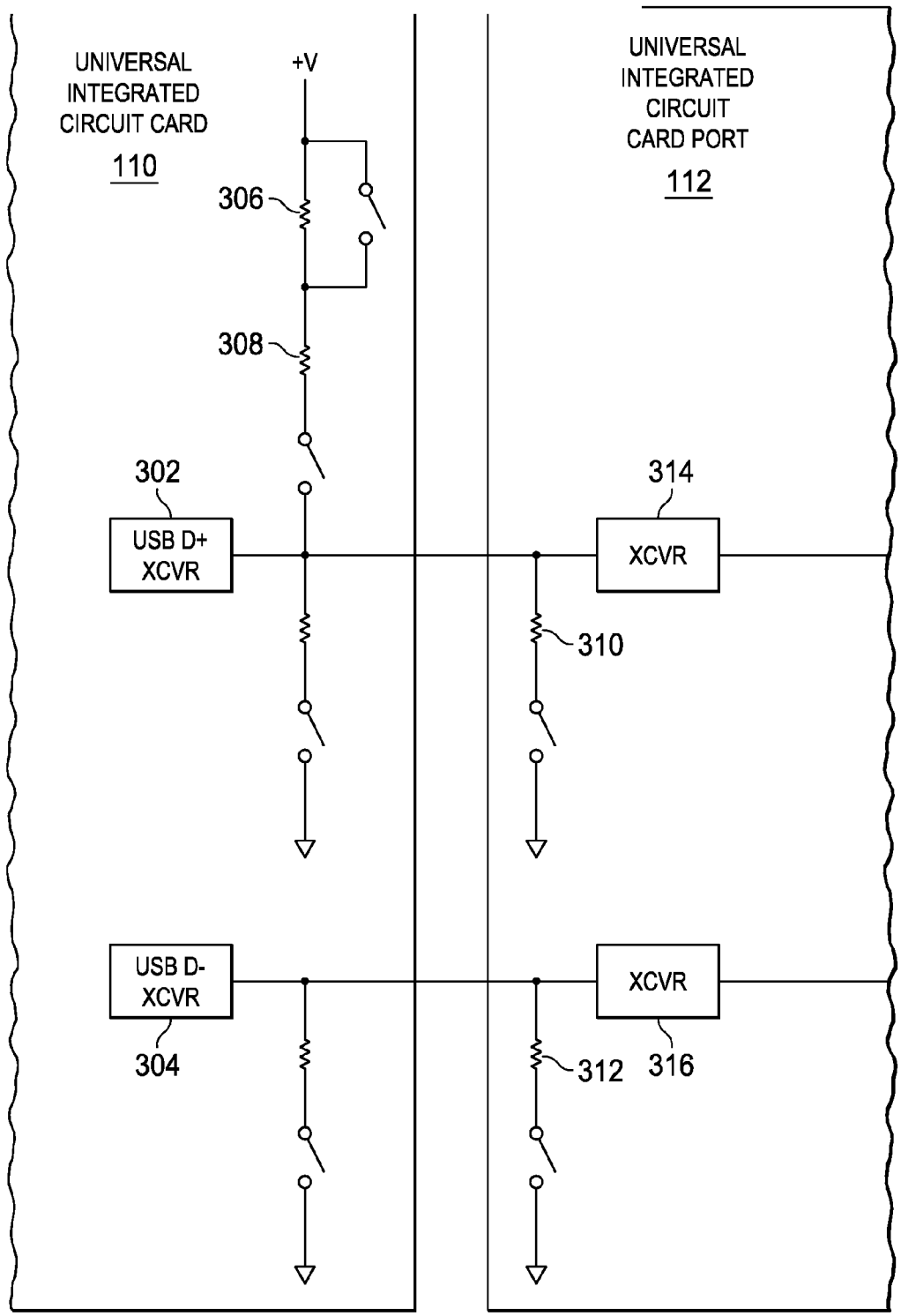
FIG. 3 shows an exemplary diagram of a portion of the UICC interface circuitry in accordance with various embodiments.

FIG. 3 shows an exemplary diagram of a portion of the UICC 110 interface circuitry in accordance with various embodiments. The UICC 110 includes transceivers 302, 304 to drive and receive differential USB signals. Pull-up resistors RPU1 308 and RPU2 306 are coupled to the output positive side transceiver 302, the transceiver for the positive signal of the USB differential pair. As shown, RPU2 306 can be bypassed allowing RPU1 alone to pull-up the signal line. In some embodiments the resistor RPU1 308 has a value in the range of 1-3 thousand ohms, and the resistor RPU2 306 has a value in the range of 30-150 thousand ohms.

The UICC port 112 includes transceivers 314, 316 for driving and receiving the positive and negative signals of the USB differential pair. Pull-down resistors 310, 312 are switchably coupled to transceivers 314 and 316 respectively. The pull-down resistors 310, 312 allow the UICC port 112 to force the inputs of the transceivers 314, 316 to a ground when no USB drive signals are present (e.g., when a non-USB UICC is connected to the UICC port 112). In some embodiments the pull-down resistors 310, 312 each have a value in the range of 30-50 thousand ohms.

Figure 4A:
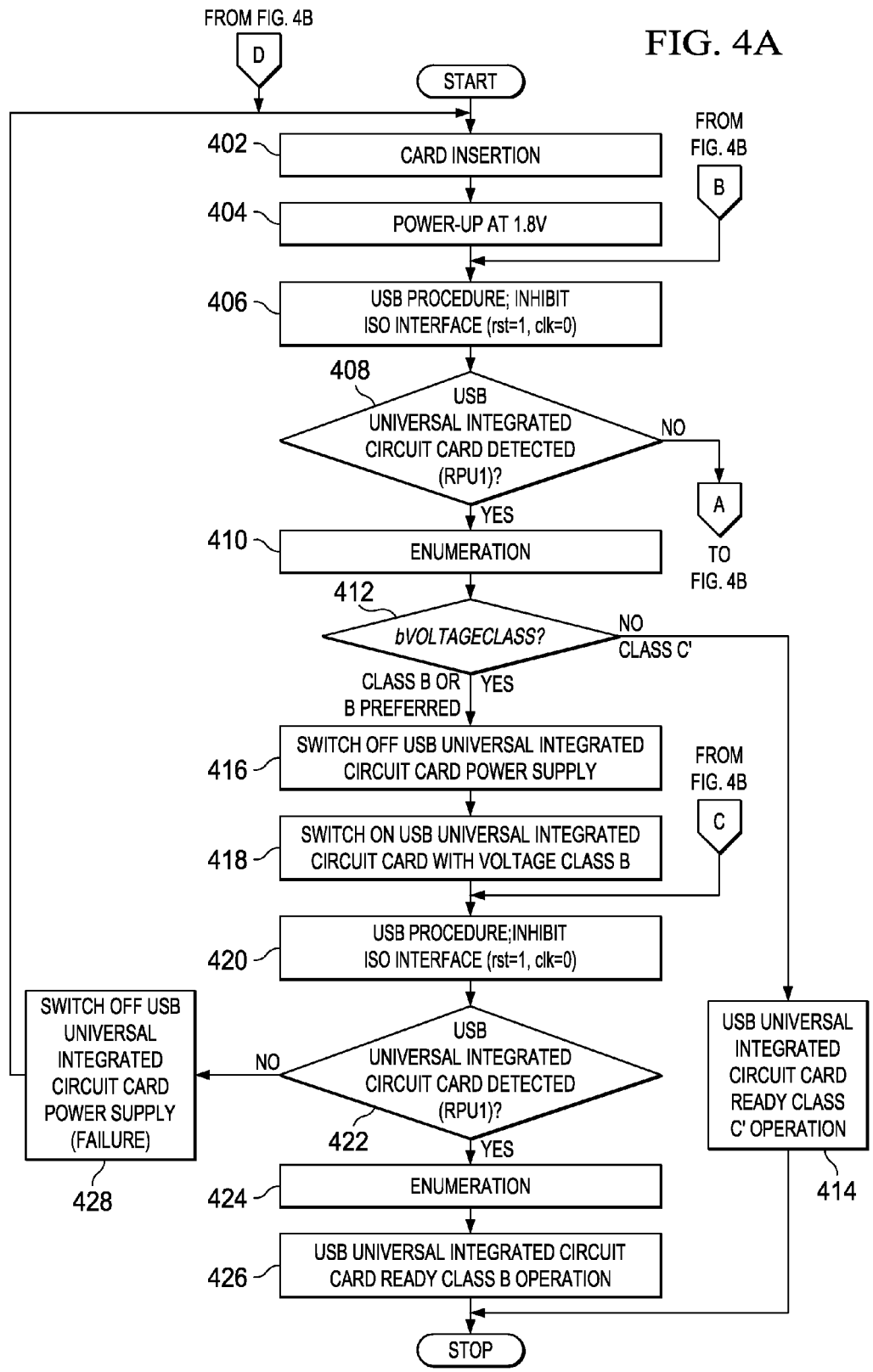
FIGS. 4A and 4B show a flow diagram for a method for automatically detecting a UICC card interface in a wireless device in accordance with various embodiments.
Figure 4B:
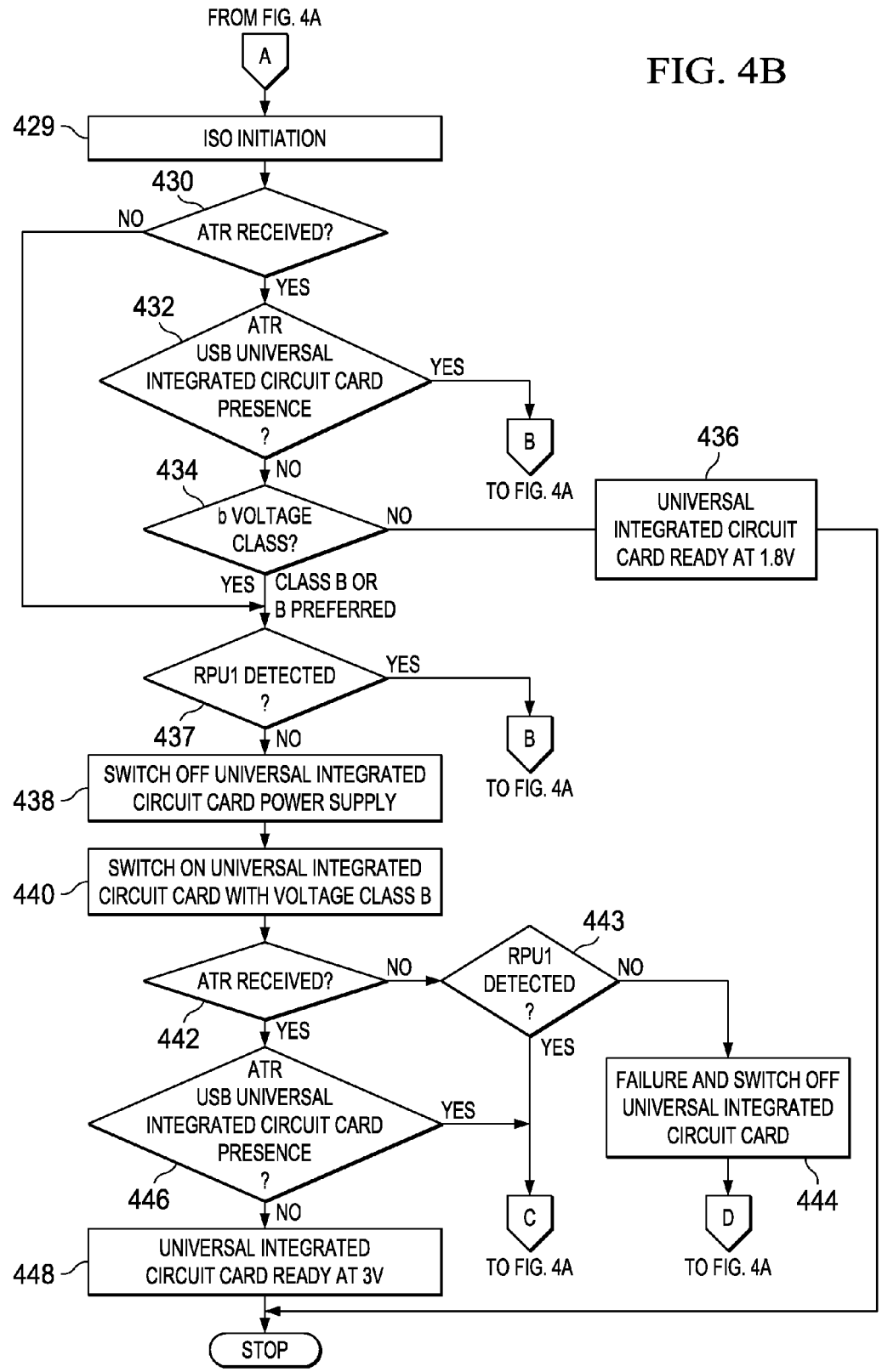

FIGS. 4A and 4B show a flow diagram for a method for automatically detecting a UICC card 110 interface in a wireless device 102 in accordance with various embodiments. Some embodiments implement the actions of FIGS. 4A and 4B as UICC detection program 204. Though depicted sequentially as a matter of convenience, at least some of the actions shown can be performed in a different order and/or performed in parallel. Additionally, some embodiments may perform only some of the actions shown.

In block 402, the UICC detector 130 determines that a UICC card 110 is coupled to the wireless device 102. The UICC detector 130 commences determination of the interface parameters of the UICC card 110, in block 404, by causing the power switching module 206 to provide the UICC card 110 with a power supply voltage. The provided power supply voltage is preferably the lowest power supply voltage of all power supply voltages applicable to an operational UICC card 110. In some embodiments, about 1.8 V can be supplied to power up the UICC card 110 in block 404.

USB interface detection operations begin in block 406 where at least some UICC operations and signals lines not relevant to the USB interface are disabled. In some embodiments, the UICC port 112 asserts the reset signal (e.g., on UICC card 110 contact 120), and prevents the clock signal from toggling (e.g., on UICC card 110 contact 124) to inhibit the UICC card 110 from performing ISO 7618-3 operations. In block 408, the UICC detector 130 determines whether the UICC card 110 is pulling up the positive signal line of the inter-chip_USB with the resistor RPU1 308, thereby indicating a USB UICC.

Following detection of a USB capable UICC card 110 in block 408, the wireless device 102 asserts USB reset (brings low both signals of the USB data pair) to the USB UICC card 110 and subsequently enumerates the USB UICC card 110 in block 410. In parallel with the USB reset, the wireless device 102 preferably disconnects pull-down resistors 310, 312 from the inter-chip USB data lines while the UICC card preferably pulls up the positive data line with series pull-up resistors RPU1 308 and RPU2 306. Enumeration includes assigning an address, and determining the capabilities of the UICC card 110, etc. During enumeration, the UICC card 110 may report a preferred operating voltage different from the power supply voltage provided. If, in block 412, the UICC card 110 does not report a different preferred voltage, the UICC card 110 and the wireless device 102 are ready for USB operation, in block 414, at the initially provided power supply (e.g., Class C) voltage.

If, in block 412, the UICC card 110 reports a different preferred voltage, for example, some UICC card embodiments may report a class B preferred voltage (about 3 V), the UICC card 110 is power cycled at the preferred voltage. In block 416, the UICC card 110 power supply is switched off. Power to the UICC card 110 is reestablished, in block 418, where the UICC detector 130 causes the power switching module 206 to provide the UICC card 110 preferred power supply voltage (e.g., B class voltage, approximately 3 V) to the UICC card 110.

In block 420, non-USB operation is inhibited by asserting a signal to the ISO reset contact and negating the ISO clock signal. If, in block 422, the UICC detector 130 determines that the UICC card 110 is pulling up the positive signal line of the IC USB with the resistor RPU1 308, thereby indicating a USB UICC, USB enumeration is performed in block 424 after the wireless device 102 has reset the USB UICC card 110 via USB reset. In parallel with the reset, the wireless device 102 preferably disconnects its pull-down resistors 310, 312 while the UICC card 110 pulls up with RPU1 308 in series with RPU2 306. The UICC card 110 and wireless device 102 are ready for USB operation at the UICC card 110 preferred voltage (e.g., class B voltage) in block 426.

If, in block 422, the positive signal line of the IC_USB is not pulled-up with resistor RPU1 308, then UICC card 110 interface detection has failed and the UICC detector 130 causes the power switching module 206 to switch off the power supply to the UICC card 100 in block 428.

Returning to block 408, if the positive signal line of the IC_USB is not pulled-up with resistor RPU1 308 of UICC card 110, then the UICC detector 130 attempts to determine whether the UICC card 110 includes an ISO 7816-3 interface. Some embodiments can begin UICC card 110 interface detection with ISO detection in block 430, rather than USB detection in block 406. In block 429, the ISO detection procedure is initiated by asserting the reset signal to the UICC card 110, and providing an appropriate and stable clock to the UICC card 110. In accordance with ISO 7816-3, a UICC card 110 implementing an ISO interface will provide an answer to reset ("ATR") signal preferably comprising an initial character, a format character, optional interface characters, optional historical characters, and a check character. Embodiments of the UICC detector 130 preferably wait a predetermined interval of time for the UICC card 110 to provide an ATR. In some embodiments, the UICC detector 130 waits approximately 16 milliseconds ("ms") to receive an ATR.

In some embodiments, if the UICC detector 130 determines, in block 430, that no ATR was transmitted, then, in block 437, the UICC detector 130 checks for the positive signal line of the IC_USB pulled-up with resistor RPU1 308 of UICC card 110. Signal line pull up with RPU1 308 indicates the presence of the UICC card 110. If the positive signal line of the IC_USB is pulled up with resistor RPU1 308 of the UICC card 110, then USB interface detection commences in block 406.

If, in block 430, the UICC detector 130 determines that an ATR was transmitted by the UICC card 110, then, in block 432, the UICC detector 130 parses the ATR to determine whether the UICC card 110 is USB capable. If the ATR indicates that the UICC card 110 includes a USB interface in addition to an ISO 7816-3 interface, then USB interface detection commences in block 406.

If the ATR does not indicate the UICC card 110 is USB capable, then the UICC detector 130 parses the ATR to determine whether the UICC card 110 prefers a different operating power supply voltage (e.g., class B, 3 V) than is being provided. In block 434, if a different power supply voltage is not indicated, then the UICC card 110 and wireless device 102 are ready for ISO operation at the current (e.g., class C) power supply voltage in block 436.

On the other hand, if the UICC card 110 prefers a different power supply voltage than is being provided, then, the UICC detector 130 causes the power switching module 206 to switch off UICC card 110 power in block 438, and to switch on the preferred UICC card 110 power supply voltage in block 440.

If the UICC detector 130 receives an ATR from the repowered UICC card 110 in block 442, then the UICC detector 130 parses the ATR. In block 446, if the ATR indicates that the UICC card 110 is USB capable, then USB detection commences at the preferred voltage in block 420. If USB interface capability is not indicated in block 446, then the UICC card 110 and the wireless device 102 are ready for operation using an ISO 7816-3 interface at the preferred power supply voltage (e.g., class B) in block 448.

If the UICC detector 130 does not receive an ATR in block 442, then, in block 443, some embodiments of the UICC detector 130 check for the positive signal line of the IC_USB pulled-up with resistor RPU1 308 of UICC card 110. Such pull-up indicates the presence of the UICC card 110. If the positive signal line of the IC_USB is pulled up with resistor RPU1 308, then USB interface detection commences at the preferred voltage in block 420. If no ATR is detected in block 442, and no positive signal line of the IC_USB pulled-up with resistor RPU1 is detected in block 443, then UICC card 110 interface detection fails and the UICC detector 130 causes the power switching module 206 to remove power from the UICC card 110 in block 444.

The above discussion is meant to be illustrative of the principles and various embodiments of the present invention. Numerous variations and modifications will become apparent to those skilled in the art once the above disclosure is fully appreciated. For example, while embodiments of interface detection have been described in terms of wireless devices, those skilled in the art will recognize that embodiments are also applicable to other devices. It is intended that the following claims be interpreted to embrace all such variations and modifications.

What is claimed is:

1. A process of operating a mobile device comprising:
   A. sensing the presence of a circuit card having one of a USB and ISO interface in a circuit card port;
   B. applying a lowest power supply voltage of all possible power supply voltages for the circuit card to the circuit card;
   C. determining whether the circuit card has a USB interface at the lowest power supply voltage;
   D. enumerating the circuit card at the lowest power supply voltage if the circuit card is determined to have a USB interface;
   E. applying a higher power supply voltage to the circuit card if the circuit card is determined to have a USB interface and if the enumerating indicates that the circuit card prefers a higher power supply voltage;
   F. enumerating the circuit card at the higher power supply voltage after determining that the circuit card has a USB interface and prefers a higher power supply voltage;
   G. determining whether the circuit card has an ISO interface at the lowest power supply voltage;
   H. parsing an answer to reset signal from the circuit card to determine whether the circuit card prefers a higher power supply voltage if the circuit card has an ISO interface;
   I. applying a higher power supply voltage to the circuit card if the circuit card is determined to have an ISO interface and if the parsing determines that the circuit card prefers a higher power supply voltage;
   J. operating the circuit card on one of the USB and ISO interfaces.

2. The process of claim 1 in which applying a lowest power supply voltage includes applying about 1.65 volts to about 1.95 volts.

3. The process of claim 1 in which applying a higher power supply voltage includes applying about 2.7 volts to about 3.3 volts.

4. The process of claim 1 in which the determining whether the circuit card has a USB interface includes determining whether a positive signal line of the interface is pulled up.

5. The process of claim 1 in which the determining whether the circuit card has an ISO interface includes asserting a reset signal to the circuit card and receiving an answer to reset signal from the circuit card.

* * * * *